May 17, 1932. N. H. RICKER 1,859,005
MEANS AND METHOD OF OBSERVING AND MEASURING ELECTROMAGNETIC FIELDS
Filed July 10, 1928 2 Sheets-Sheet 1
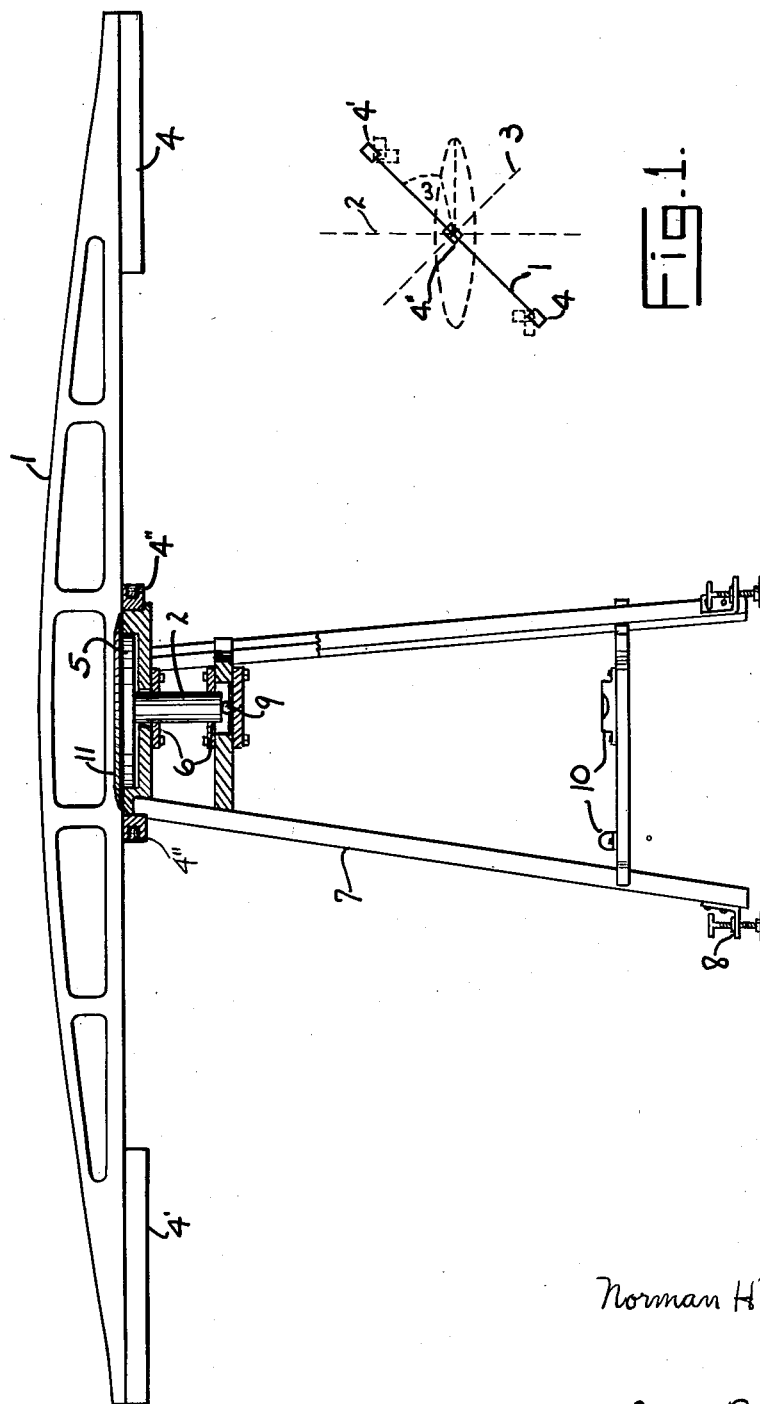
Norman H Ricker Inventor
By Jesse P. Stone
His Attorney May 17, 1932.  N. H. RICKER  1,859,005
MEANS AND METHOD OF OBSERVING AND MEASURING ELECTROMAGNETIC FIELDS
Filed July 10, 1928  2 Sheets-Sheet 2
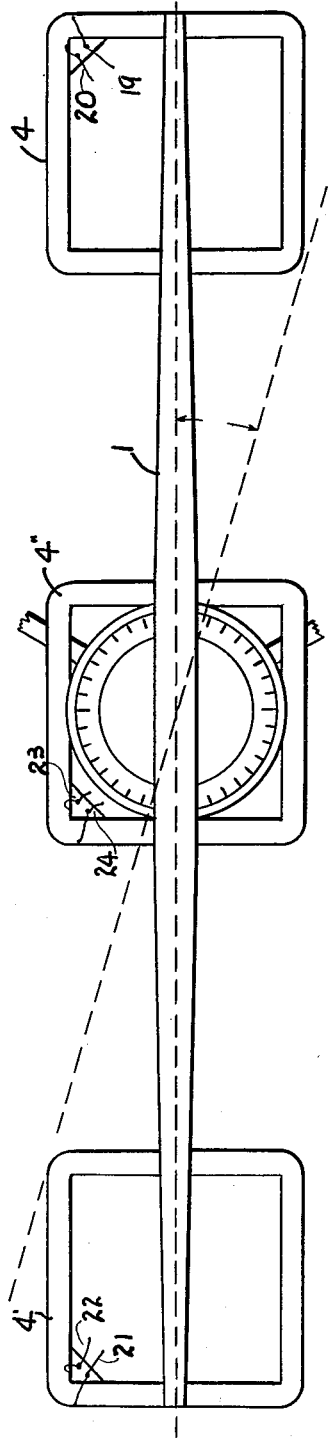
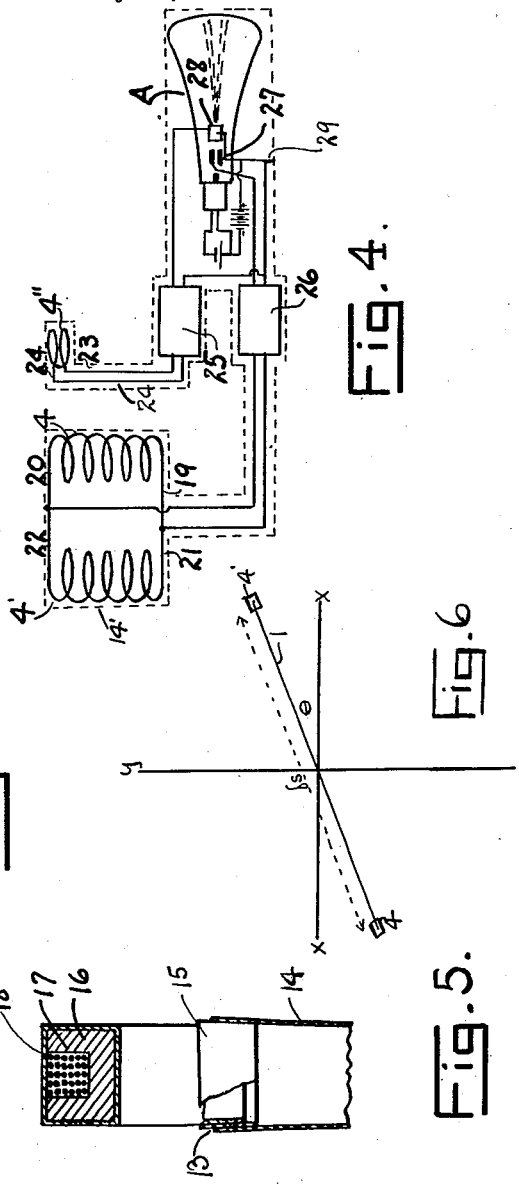
Norman H. Ricker  Inventor
By Jesse R. Stone
His Attorney Patented May 17, 1932

1,859,005

UNITED STATES PATENT OFFICE

NORMAN H. RICKER, OF HOUSTON, TEXAS, ASSIGNOR TO J. P. SCRANTON, OF HOUSTON, TEXAS, TRUSTEE

MEANS AND METHOD OF OBSERVING AND MEASURING ELECTROMAGNETIC FIELDS

Application filed July 10, 1928. Serial No. 291,633.

This invention relates to a means and method of measuring alternating electromagnetic fields in general, and finds a particular application in studying the alternating electro-magnetic field over the surface of the earth due to alternating electric currents passed or induced into the earth as in the case of exploring for underground mineral deposits.

One object of this invention is to provide a method of observing and measuring electromagnetic fields based on the use of the differential field between two slightly separated points as compared with the field itself in the neighborhood of these two points.

A further object of this invention is to provide an apparatus for making observations by means of this method whereby the nature of the electro-magnetic field is determined.

I have developed a mathematical theory of my method and applied this theory to one form of my apparatus whereby formulæ are obtained by means of which the quantities determining the electro-magnetic field may be calculated from the data obtained with the apparatus. The further objects of the invention will be better understood from the specification which follows:

In explaining my invention I will refer to the drawings herewith, wherein Fig. 1 is a diagrammatic view of the general form of my apparatus illustrating how readings may be obtained. Fig. 2 is a side elevation of a particular form of the apparatus, certain parts being broken away for greater clearness. Fig. 3 is a top plan view of the apparatus shown in Fig. 2. Fig. 4 is a schematic drawing of the electrical circuit and shows the relation of the component parts of my apparatus to one another. Fig. 5 is a broken detail illustrating the method of shielding the loops. Fig. 6 is a mathematical sketch of the balance beam.

It is well known that electro-magnetic fields in the neighborhood of conducting bodies are of a rotating nature, that is to say, two perpendicular components of the field are in general not in phase with one another. Moreover, the amplitudes of these two components are in general different, with the result that the resulting field is of an elliptical nature. A third component, perpendicular to the two components mentioned above, will, in general, have a different amplitude from, and bear a different phase relation to the other two components, with the result that the total resultant field will be of an elliptical nature lying in a plane. This electro-magnetic field can be completely described by giving the position, or orientation in space, of this plane of the vibration ellipse together with the eccentricity of said ellipse, and the direction and magnitude of its major and/or minor axis. Prior inventions have concerned themselves with the determination of these above mentioned quantities.

The invention herein described differs from prior inventions in that instead of determining the electro-magnetic field at a point, I determine instead the difference in electro-magnetic fields betwen two points separated a short distance apart. In other words, observations are made on the differential field. In order to do this the device shown in Fig. 1 is used. In this figure a beam 1 is so mounted that it may be rotated about its center by means of a vertical axis 2 and a horizontal axis 3. On either end of this beam is attached a loop 4, 4', consisting of a large number of turns of wire wound on a frame. Between these loops a third loop 4" may be mounted. The loops 4, 4' have induced in them alternating electro-motive forces which are so combined that the resultant electro-motive force from the instrument represents the difference in electro-motive forces of the two loops. Since the electro-motive force induced in a single loop can be used to measure the amplitude and phase of the alternating magnetic field through the loop, the electro-motive force from the instrument affords a means of measuring the differential electro-magnetic field between the two loops.

The magnetic field H at any point in space may be represented by its three components.

$$H_x = A \cos(pt - \delta_1)$$
$$H_y = B \cos(pt - \delta_2)$$
$$H_z = C \cos(pt - \delta_3)$$

Where $A$, $B$, $C$, $\delta_1$, $\delta_2$, $\delta_3$ are functions of $x$, $y$ and $z$.

I will now discuss the theory of the instrument, which I will call an electro-magnetic differential field balance, and will confine myself to the special case where the angle $\omega$ of Figure 1 is zero. In other words, the beam is capable of rotation about a vertical axis only, the beam always being horizontal. Moreover, we will suppose that the balance is being used to measure the derivative of the vertical component of the magnetic field, the loops therefore being fixed to the beam with their planes horizontal. I will define a set of coordinate axes such that the $z$ axis is vertically upwards and $x$ and $y$ axes parallel to the earth's surface.

Consider now the vertical component $H_z$ which is measured by the instrument. $H_z$ may be expanded about the origin.

(2) $H_z = C_o(1 + ax + by + cz) \cos(pt - \alpha x - \beta y - \gamma z)$ (Neglecting terms of higher degree than the first.)

(3) $\delta H_z = \dfrac{\partial H_z}{\partial x}\delta x + \dfrac{\partial H_z}{\partial y}\delta y + \dfrac{\partial H_z}{\partial z}\delta z$ As I am concerned now with rotation about the vertical axis only $$\delta z = 0$$

(4) $\dfrac{\partial H_z}{\partial x} = C_o[a \cos pt + \alpha \sin pt]$ at $\begin{array}{l}x=0\\y=0\\z=0\end{array}$ (5) $\dfrac{\partial H_z}{\partial y} = C_o[b \cos pt + \beta \sin pt]$ $$\delta x = \dfrac{\delta s}{2} \cos\theta \quad \delta y = \dfrac{\delta s}{2} \sin\theta \quad \delta z = 0$$

These quantities are shown in Fig. 6 which is a mathematical sketch of the balance beam and its orientation with respect to the $x$ and $y$ axes—the sketch being a plan view. The loops are not likely to have the same "pickup" factor, so let the E. M. F. induced into the first loop be equal to $k_1 \times H_z$ and E. M. F. induced into the second loop be equal to $k_2 \times H_z$, then (7) E. M. F. in first loop =
$$k_1\left[H_z + C_o \dfrac{\delta s}{2}\left\{\cos pt \cdot (a\cos\theta + b\sin\theta) + \sin pt \cdot (\alpha\cos\theta + \beta\sin\theta)\right\}\right]$$

(8) E. M. F. in second loop =
$$k_2\left[H_z - C_o \dfrac{\delta s}{2}\left\{\cos pt \cdot (a\cos\theta + b\sin\theta) + \sin pt \cdot (\alpha\cos\theta + \beta\sin\theta)\right\}\right]$$

Since the two loops are connected so that the output E. M. F. is the difference, the output E. M. F. is given by (9) $E = H_z(k_1 - k_2) + C_o\dfrac{k_1 + k_2}{2}\delta s$
$[\cos pt \cdot (a\cos\theta + b\sin\theta) + \sin pt \cdot (\alpha\cos\theta + \beta\sin\theta)]$ which may be written

(10) $E = K \cos(pt - \Delta)$

(11) $\tan\Delta = \dfrac{\alpha\cos\theta + \beta\sin\theta}{a\cos\theta + b\sin\theta + \dfrac{\epsilon}{L}}$ where $$\epsilon = \dfrac{k_1 - k_2}{k_1}$$

since $\epsilon$ is small compared with unity, and "L" being the distance between the loops.

When $\Delta$ vanishes the differential field is in phase with $H_z$ and in this case

(12) $\tan\theta = -\dfrac{\alpha}{\beta}$

We can so choose our $x$ and $y$ axes that the $x$ axis lies along the isophasal direction so that $\alpha = 0$, then

(13) $\tan\Delta = \dfrac{\beta\sin\theta}{a\cos\theta + b\sin\theta + \dfrac{\epsilon}{L}}$ When the differential field is in quadrature with $H_z$ $\tan\Delta = \infty$ and $a\cos\theta + b\sin\theta + \dfrac{\epsilon}{L} = 0$ Unless $\epsilon$ is zero there are two solutions of this equation.

Let $\theta_1$ and $\theta_2$ be these two solutions. We see then that

(14) $\dfrac{\sin\theta_1 - \sin\theta_2}{\cos\theta_1 - \cos\theta_2} = -\dfrac{a}{b}$ $\sin\theta_2$ and $\cos\theta_2$ are both negative so if we take the angles $\phi_1 = \theta_1$ and $\phi_2 = \theta_2 \mp 180°$

(15) $\dfrac{\sin\phi_1 + \sin\phi_2}{\cos\phi_1 + \cos\phi_2} = -\dfrac{a}{b}$

Now consider the amplitude of $$H_z = C_o(1 + ax + by + cz) = C$$

and how it varies with $\theta$. In other words I will see how C varies as I move around a circle of radius $$\frac{\delta s}{2}$$

(16) $\quad \frac{dC}{ds} = \frac{\partial C}{\partial x}\cos\theta + \frac{\partial C}{\partial y}\sin\theta = a\cos\theta + b\sin\theta$ And let us consider a direction $\Theta$ along which C is constant. Then

(17) $\quad \tan\theta = -\frac{a}{b}$ but we have already seen that $$-\frac{a}{b} = \frac{\sin\phi_1 + \sin\phi_2}{\cos\phi_1 + \cos\phi_2} \quad \text{(Equation 15)}$$

so

(18) $\quad \tan\Theta = \frac{\sin\phi_1 + \sin\phi_2}{\cos\phi_1 + \cos\phi_2}$ Thus to determine the direction of the iso-amplitudial I measure experimentally the two positions of the beam for which the differential field is in quadrature with $H_z$ and from Equation (18) calculate $\Theta$.

Now, consider the amplitude of the differential field. From Equations 9 and 10

(19) $\quad K^2 = (\text{coefficient of } \cos pt)^2 + (\text{coefficient of } \sin pt)^2$ By taking these coefficients from Equation (9) and remembering that I have set $\alpha$ equal to zero and $\delta s = L$ I obtain for $K^2$

(21) $\quad K^2 = k_2^2 C_o^2 L^2 \left\{ \begin{array}{l} \frac{E^2}{L^2} + a^2\cos^2\theta + b^2\sin^2\theta + 2ab\sin\theta\cos\theta \\ + 2\frac{E}{L}a\cos\theta + 2\frac{E}{L}b\sin\theta + \beta^2\sin^2\theta \end{array} \right\}$ When $\theta = 0$

(22) $\quad K^2 = k_2^2 C_o^2 L^2 \left[ \frac{E^2}{L^2} + a^2 + 2\frac{E}{L}a \right]$ When $\theta = \pi$

(23) $\quad K^2 = k_2^2 C_o^2 L^2 \left[ \frac{E^2}{L^2} + a^2 - 2\frac{E}{L}a \right]$

(24) $\quad \text{Difference} = K_o^2 - K_\pi^2 = D^2 = 4k_2^2 C_o^2 L E$

If $\epsilon$ is already known—as it should be—(a) can be determined for

(25) $\quad a = \frac{K_o^2 - K_\pi^2}{4k_2^2 C_o^2 L E}$

If $\epsilon$ is very small so that it cannot be determined accurately it is negligible with respect to the other quantities and then from Equation (22) we get

(26) $\quad a = \frac{K_o}{kC_oL}$

Having determined $a$, $b$ can be determined, for Equation 18 gives

(27) $\quad b = -a\cot\theta$ $C_o$ can be determined directly by the E. M. F., induced in a single loop if we previously determine its lower case "pick-up" factor; and by pick-up factor I mean the E. M. F. between the terminals of the loop when unit alternating magnetic field of the frequency used is passing through the loop.

If $\epsilon$ is negligible $\beta$ may readily be determined by observing the E. M. F. at asimuth $\frac{\pi}{2}$ for in this case

(28) $\quad \beta^2 = \frac{K^2_{\pi/2}}{k^2 C_o^2 L^2} - b^2$ and $b$ has already been determined.

$\beta$ can also be determined when $\epsilon$ is not negligible, but it is much better to keep $\epsilon$ negligibly small for the formulæ are then much simpler and the operation of the instrument is then much more satisfactory.

The isophasal is a line drawn on the surface of the earth through all points at which the phase angle of the vertical component of the magnetic field is the same. The isoamplitudinal is similarly a line drawn on the surface of the earth through all points at which the amplitude of the vertical component of the magnetic field is the same. It is believed that the terms "isophasal" and "isoamplitudinal" are well understood and need no further explanation for the reason that iso means "having the same" and when used as a suffix with the words "phasal" and "amplitudinal" it is believed that the directions intended are adequately described.

It will be readily apparent that my attempt in the present application is to compare $\frac{dH}{dS}$ (which is the rate of change of the magnetic field, both in intensity and phase, with respect to position in any particular direction with the field itself, both in intensity and phase). In order to do this in practice it is necessary to compare the differential field between two spaced points with the field itself. This differential field divided by the distance of separation of the two spaced points is an approximation to the derivative and is in practice substantially an accurate approximation. The rate of change in H with respect to the position is the limit of $\frac{\Delta H}{\Delta S}$ as $\Delta S$ approaches zero. Obviously $\frac{dH}{dS}$ cannot actually be determined but actually we determine $\frac{\Delta H}{\Delta S}$. This is a matter of mathematical logic and for all practical purposes within the scope of my invention $\frac{\Delta H}{\Delta S}$ is just as accurate as its limit $\frac{dH}{dS}$ when $\Delta S$ approaches zero.

In applying my invention with the formulæ above obtained, the following facts are to be noted:

To determine the isophasal direction the beam is rotated until the differential field is in phase with H$z$. The direction of the beam is then along the isophasal passing through the center of the instrument. Take this direction as the $x$ axis.

To determine the isoamplitudinal direction the beam is rotated until the two positions are found in which the differential field is in quadrature with H$z$. The azimuth of the isoamplitudinal can then be obtained by means of Equation 18.

$\alpha$ is taken equal to zero by defining the direction of the $x$ axis as I did above. $(a)$ can be determined by measuring the E. M. F. in azimuth zero degrees and 180 degrees, and using Formula 25, or if $\epsilon$ is negligible Formula 26 may be used; $(b)$ can be determined by Formula 27; to determine $\beta$ Formula 28 is used. This theory can easily be extended to cover any of the other types of balance to be described.

One form of the apparatus which may be used in practicing the invention is shown in Figs. 2 and 3, which illustrate an electromagnetic differential field balance with loops of the non-adjustable type. The beam 1 may be about twelve feet long. It is rotatable about a vertical axis provided by a shaft 2 formed upon a plate 5 secured to the lower side of the beam. Said shaft is supported for rotation in bearings 6 in a tripod frame 7 adjustable upon feet 8 for leveling the device. The shaft rests upon a ball 9 for anti-friction purposes, so that the beam may be rotated easily. Spirit levels 10 upon the supporting frame are provided so that the position of the frame relative to the horizontal may be determined. A scale 11 may be formed upon an upper flange on plate 5 to indicate the position of the beam.

The loops 4 and 4' at each end of the beam are for picking up the electro-magnetic fields. They are mounted in a horizontal position which may be fixed relative to the beam, or adjustable, as indicated by the dotted lines in Fig. 1. The central loop 4" is to pick up the vertical magnetic field with which to compare the differential field shown by the other loops.

The loops should be well shielded from capacity pick-up by being enclosed within a metallic shield, say of brass, the shield being so arranged as not to afford a continuous electrical circuit about the loops. This may be accomplished by providing a gap 13 in the circuit of the shield 14, allowing the meeting ends of said shield to overlap, as shown in Fig. 5. A strip 15 of insulating material, such as mica, is placed between the said ends.

As will be seen from Fig. 5, the loop is preferably made up of a core 16 of light material such as wood. This core is channeled out at 17 on its outer periphery to provide a space to receive the windings 18 of the loop. In the foregoing analysis the method of determining the isophasal and isoamplitudinal directions has been described as well as how to calculate the constants $a$, $b$ and $\beta$. From these experimentally determined quantities we can determine $\frac{dH_z}{dX}$ and $\frac{dH_z}{dY}$ where $x$ and $y$ are two mutually perpendicular directions lying along the earth's surface. The isophasal and isoamplitudinal lines are drawn on the corresponding map and the values of $$\frac{dH_z}{dX} \text{ and } \frac{dH_z}{dY}$$

can be plotted on co-ordinate paper or any other manner as a function of position of the observatory point. If either by theoretical analysis or by experimental observation we can determine the normal values of these quantities, then by comparing any set of observed values obtained in the region being explored and by comparing these values with the normal values in homogeneous territory, deviations may be obtained which can be attributed to the presence of buried mineral deposits in the neighborhood of the observations. The loop is preferably rectangular in shape and has as many windings of conducting wire as may be desired for the particular purpose. The ends of the loop shown at 19 and 20 on loop 4; 21, 22 on loop 4', and 23, 24 in loop 4", as indicated in Fig. 3 may be connected up with the indicating apparatus, as will be later noted. These loops are so connected that the electro-motive force delivered by the instrument will be the difference between the electromotive forces of the separate loops.

In Fig. 4 is shown a schematic diagram of the electrical connections of the entire apparatus wherein the two end loops 4, 4' are shown, as is also the mid loop 4" and the manner in which these loops are connected to the amplifiers 25, 26. As will be noticed the terminals 22, 20 which come from the inner end of the windings of the end loops are connected together and are electrically connected with the grid of the amplifier 26. Care must be exercised to see that the direction of winding of the loops 4, 4' are such that the input to the amplifier 26 will represent the difference between the electro-motive forces of these two loops. The inner terminal 23 of the mid loop 4" is similarly connected to the grid of the amplifier 25. The output from the two amplifiers are connected to the vertical and horizontal plates 28, 27 of the cathode ray oscillograph A as shown in Fig. 4. This oscillograph is a well known device and the means of operating it is familiar to all versed in the art. The dotted line 14' in Fig. 4 indicates a shield, preferably of metal, it being understood that the whole device including the wiring and connecting cable is shielded as are the loops, the shield being connected to the circuit at 29.

While I have shown and described my invention as employed with an oscillograph, I wish it to be understood that other devices may be substituted for the oscillograph to compare the output from the amplifiers. A pair crossed vibration galvanometers, crossed electro-magnetically operated tuning forks, or comparison of phase by means of the binaural effect or other similar devices may be used without departing from the spirit of the invention. The directions of winding of the loops are such that the average field will cause currents to flow in the closed circuit, and the differential magnetic field will cause an electro-motive force to be produced at the terminals 20, 22 and 21, 19. This electro-motive force due to the differential magnetic field will in general be feeble and must be amplified before observation can be made by means of it.

The amplifiers are high gain vacuum tube amplifiers, having as high an amplification as can be realized in practice. The mid loop 4" is excited by the vertical component of the alternating magnetic field, and the electro-motive force delivered by this loop is amplified by a similar amplifier 25.

The output currents from the amplifiers 26 and 25 must now be compared. This comparison can be effected by means of the vacuum tube oscillograph A, by causing the output E. M. F.'s of amplifiers 26 and 25 to excite the two pairs of plates 27, 28 of this oscillograph. As a result the pattern observed on the oscillograph will in general be an ellipse whose eccentricity and axial direction will be altered as the beam of the balance is rotated. The amplifying systems should be so designed that the over-all shift in phase is the same in each. When the pattern observed is a straight line it will indicate that the differential magnetic field is exactly in phase, or exactly out of phase, with the magnetic field itself. As the loops are nearly equal in pick-up factor the shift in phase of the differential field with respect to the field itself can be observed to vary as the beam is rotated, and positions of in phase, out of phase, and quadrature can readily be determined. Moreover, by means of the oscillograph the E. M. F.'s from the amplifiers can be measured and so the amplitude of the differential magnetic field can be computed.

In using this invention in the field it is necessary first to set up an alternating electro-magnetic field. This may be done by passing an alternating electric current through the earth by means of two electrodes buried in the earth or by inducing an alternating electric current in the earth by means of a large loop of wire, which may consist of a single turn of wire, laid upon the surface of the ground or supported a short distance above it. This loop may be a mile or more in diameter. An alternating electric current passed around this loop will induce alternating electric currents in the earth. In either case an alternating electro-magnetic field will be produced which will vary from point to point over the surface of the ground.

In order to make measurements on this electro-magnetic field by means of this invention the apparatus Figs. 2 and 3 is set up and leveled as shown in the drawings. Electrical connections are made according to the schematic drawing Fig. 4. The beam is rotated until its length lies along some survey line on the earth's surface used as a direction of reference and the azimuth circle is then read. The beam is then rotated while the observer watches the oscillograph. As the beam is rotated the pattern as observed in the oscillograph changes. If the wave form is purely sinusoidal, as it should be, and there is no distortion in the amplifiers, and if the phase shift through the amplifier is the same for each amplifier, the following effects are observed. As the beam rotates the pattern will change from a straight line into an ellipse of varying eccentricity, then into a second straight line, in a different position from the first, again into an ellipse and back into the original straight line. The observed phenomena can best be studied by imagining the pattern not as a plane curve, but as a curve in space drawn around a cylinder which cylinder rotates as the beam rotates. When the pattern is observed "edge-on" the beam's length lies along the isophasal line, for the fields are then either exactly in phase or exactly out of phase. When the cylinder is observed to have rotated 90 degrees from either of these two "edge-on" positions the potentials on the plates of the oscillograph are in quadrature and the azimuth circle should be read in each of these critical positions, i. e. both edge on (in phase) positions and both quadrature positions. The angles which the beam makes with any arbitrary direction may then be calculated and by means of the formulae the directions of the isophasal and isoamplitudinal lines through the point of observation may be determined. In order to determine the coefficients it is necessary to measure the amplitudes of the oscillograph's vibration. If the oscillograph and amplifiers, together with the loops, have been calibrated by measurements on a standard field these coefficients may be calculated by means of the formulae given. This instruction in the use of the instrument should be understood by anyone versed in the art of alternating current measurements.

Also care must be taken to see that the loops are made as nearly alike as possible and that symmetry be maintained. For instance I have found it best to bring the inner end of each loop out to go to the grid of the amplifier as the inner end is farthest from the shield. Connecting the inner end of one loop to the outer end of the other loop and bringing this common point out to the grid is especially unsatisfactory as it destroys the symmetry of the circuit.

My apparatus is simple in construction and as I am enabled to get a visible record of the variations of the electro-magntic field, the device may be used expeditiously and with an accuracy not heretofore possible.

Having thus described my invention, what I claim as new is:

1. A method of observing and measuring alternating electro-magnetic fields, which consists in comparing $$\frac{\Delta H}{\Delta s}$$

with H, where H is the electro-magnetic field, and $s$ is the distance in any particular direction.

2. A method of observing and measuring alternating electro-magnetic fields, which consists in comparing $$\frac{\Delta H}{\Delta s}$$

with H, where H is any component of the electro-magnetic fields, and $s$ is the distance in any particular direction.

3. A method of observing and measuring alternating electro-magnetic fields, which consists in comparing the differential electro-magnetic field between two points in space with the electro magnetic field at a third point in the neighborhood of the first two.

4. A method of observing and measuring alternating electro magnetic fields, which consists in so combining the alternating electro-motive forces delivered by two loops spaced in the electro-magnetic field, that the resultant E. M. F. is the difference between the E. M. F.'s of the separate loops, and comparing this differential E. M. F. with the E. M. F. delivered by a third loop placed in the neighborhood of the first two, with respect to amplitude and phase.

5. A method of observing and measuring electro-magnetic fields due to alternating electric currents passed or induced into the earth which consists in comparing the differential electromagnetic field between two points slightly displaced with the electromagnetic field at any third point.

6. A method of observing and measuring electro-magnetic fields due to alternating electric currents passed or induced into the earth which consists in comparing the differential electro-magnetic field between two points slightly displaced with the electromagnetic field at a third point in the neighborhood of the other two points.

7. A method of observing and measuring electro-magnetic fields due to alternating electric currents passed or induced into the earth which consists in comparing the differential of any component of the electro magnetic field between two points, slightly displaced, with any component of the electro magnetic field at any third point.

8. A method of observing and measuring electromagnetic fields and variations in the same which consists in causing alternating electric currents to flow in the earth and comparing at a series of places over the surface of the earth, the differential electro-magnetic field with the electro-magnetic field itself and correlating the data thus obtained.

9. An apparatus of the character described comprising a beam pivoted to rotate about a vertical axis, loops of conducting wire at each end of said beam, a central loop midway between the ends of said beam, means of connecting the end loops to obtain the difference between the electro-motive forces induced therein, means of amplifying this differential electro-motive force, means of separately amplifying the electro-motive force induced into the central loop, and means for comparing said amplified electromotive forces with respect to amplitude and phase.

10. An apparatus of the character described comprising a beam pivoted to rotate on an axis midway between its ends, loops of conducting wire at each end of said beam, said loops being connected to deliver an electro-motive force which is the measure of the differential electro-magnetic field between them, a third loop mounted on said beam to pick up the electro-magnetic field itself and means to compare the electro-motive force of said differential field with that delivered by said third loop.

11. A device of the character described including a beam, a pair of spaced loops of electricconducting wire disposed at opposite ends thereof, said loops being incased in sleeves of metal surrounding said loops and electrically insulated at their meeting ends to shield said loops, means connecting said loops to obtain the difference between the electro-motive forces induced therein, and means to amplify said forces.

12. In a device for observing and measuring the differential electro-magnetic field at a region in space and comparing it with the electro-magnetic field itself, a beam rotatable about a plurality of axes, a loop of conducting wire at each end of said beam, a third loop centrally of said beam, means connecting said end loops together to obtain the difference between the electro-magnetic forces induced into the separate loops, separate means to amplify the electro-motive forces of the end loops and the central loop and means to compare said electro motive forces of the central loop with the difference between that of the end loops.

In testimony whereof I hereunto affix my signature this 7th day of July, A. D. 1928.

NORMAN H. RICKER.